US009869581B2

(12) United States Patent
Miura et al.

(10) Patent No.: US 9,869,581 B2
(45) Date of Patent: Jan. 16, 2018

(54) DETECTION DEVICE, LOAD CONTROL DEVICE, AND LOAD CONTROL SYSTEM

(71) Applicant: Panasonic Intellectual Property Management Co., Ltd., Osaka (JP)

(72) Inventors: Kei Miura, Mie (JP); Tomoaki Sasaki, Mie (JP); Koichiro Kui, Mie (JP); Yoshitaka Kimura, Mie (JP); Hirofumi Sugiyama, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/057,720

(22) Filed: Mar. 1, 2016

(65) Prior Publication Data
US 2016/0265965 A1 Sep. 15, 2016

(30) Foreign Application Priority Data

Mar. 13, 2015 (JP) .................................. 2015-051095

(51) Int. Cl.
G01J 5/00 (2006.01)
G01J 1/42 (2006.01)
(Continued)

(52) U.S. Cl.
CPC ............ G01J 1/4228 (2013.01); G01J 1/0266 (2013.01); G01J 1/0271 (2013.01); G01V 8/20 (2013.01)

(58) Field of Classification Search
CPC ....... G01J 1/4228; G01J 1/0266; G01J 1/0271
(Continued)

(56) References Cited

U.S. PATENT DOCUMENTS 8,659,230 B2 2/2014 Nanahara et al.
2004/0051659 A1* 3/2004 Garrison ............... G01S 13/931
342/70
(Continued)

FOREIGN PATENT DOCUMENTS

CN 202059651 U 11/2011
CN 102414519 A 4/2012
(Continued)

OTHER PUBLICATIONS

Taiwanese Office Action and Search Report issued in corresponding Taiwanese Patent Application No. 105106195, dated Nov. 23, 2016; with partial English translation.
(Continued)

Primary Examiner — David Porta
Assistant Examiner — Meenakshi Sahu
(74) Attorney, Agent, or Firm — McDermott Will & Emery LLP

(57) ABSTRACT

A detection device includes: a first sensor which detects, based on a captured image, whether a person is present in a first detection range; a plurality of second sensors which are disposed around the first sensor, and detect, based on infrared radiation, whether a person is present in respective second detection ranges each of which overlaps at least a portion of the first detection range; and at least one hood which blocks part of infrared radiation directed to at least one of the plurality of second sensors, to reduce a non-overlapping portion of a combined detection range of the first detection range of the first sensor and the second detection ranges of the plurality of second sensors, the non-overlapping portion being a portion in which the first detection range and the second detection ranges do not overlap.

10 Claims, 12 Drawing Sheets

(51) Int. Cl.
*G01J 1/02* (2006.01)
*G01V 8/20* (2006.01)

(58) Field of Classification Search
USPC ...................................................... 250/338.1
See application file for complete search history.

(56) References Cited

U.S. PATENT DOCUMENTS

2005/0200473 A1* 9/2005 Noguchi ................ G08B 29/18
340/507
2012/0306371 A1  12/2012  Du et al.
2012/0319596 A1  12/2012  Nanahara et al.

FOREIGN PATENT DOCUMENTS

| CN | 103299545 A | 9/2013 |
| EP | 2 645 570 A1 | 10/2013 |
| JP | 2001-237085 A | 8/2001 |
| JP | 2001-325677 A | 11/2001 |
| JP | 2002-134282 A | 5/2002 |
| JP | 2002-303681 A | 10/2002 |
| JP | 2013-004311 A | 1/2013 |
| JP | 2013-096947 A | 5/2013 |

OTHER PUBLICATIONS

Notification of First Office Action issued in corresponding Chinese Patent Application No. 201610114649.5, dated Nov. 13, 2017; with English translation.

\* cited by examiner

DETECTION DEVICE, LOAD CONTROL DEVICE, AND LOAD CONTROL SYSTEM

CROSS REFERENCE TO RELATED APPLICATION

This application claims the benefit of priority of Japanese Patent Application Number 2015-051095 filed on Mar. 13, 2015, the entire content of which is hereby incorporated by reference.

BACKGROUND

1. Technical Field

The present disclosure relates to a detection device, a load control device, and a load control system.

2. Description of the Related Art

Conventionally, a load control device has been used, which controls a load device that is a control target, based on a result of detection by a sensor which detects whether a person is present.

A lighting control terminal which includes an imaging element has been known (see Japanese Unexamined Patent Application Publication No. 2013-4311 (Patent Literature 1)).

The lighting control terminal disclosed in Patent Literature 1 determines whether a person is present, based on an image captured by the imaging element, to control dimming of lighting apparatuses. An image capturing range of the imaging element is determined so as to include illumination ranges of the lighting apparatuses. The lighting control terminal divides the captured image into a plurality of regions in correspondence with the illumination ranges of the lighting apparatuses. Upon the detection of a person who has entered the room from the captured image, the lighting control terminal according to Patent Literature 1 controls the dimming of a lighting apparatus for a region where the person is present.

In addition, as a configuration applicable to load control device, a human body detecting device is known (see Japanese Unexamined Patent Application Publication No. 2001-325677 (Patent Literature 2)) which includes a human body detecting sensor which captures an image of motion of a human body and processes the image, and an infrared sensor which operates by thermal sensing.

The human body detecting device according to Patent Literature 2 includes an infrared sensor in addition to a human body detecting sensor so that the infrared sensor which performs detection at a high speed complements a delay in image processing by the human body detecting sensor, thus improving sensing performance.

SUMMARY

There is a demand for a load control device that has a configuration for more accurately detecting a person, and also a demand for further improvement in the configuration since the configurations of the lighting control terminal according to Patent Literature 1 and the human body detecting device according to Patent Literature 2 are insufficient.

The present disclosure provides a detection device which detects a person more accurately, a load control device, and a load control system.

A detection device according to the present disclosure includes: a first sensor which detects, based on a captured image, whether a person is present in a first detection range; a plurality of second sensors which are disposed around the first sensor, and detect, based on infrared radiation, whether a person is present in respective second detection ranges each of which overlaps at least a portion of the first detection range; and at least one hood which blocks part of infrared radiation directed to at least one of the plurality of second sensors, to reduce a non-overlapping portion of a combined detection range of the first detection range of the first sensor and the second detection ranges of the plurality of second sensors, the non-overlapping portion being a portion in which the first detection range and the second detection ranges do not overlap.

Furthermore, a load control device according to the present disclosure includes: the detection device; and a load controller which controls a load, based on a result of detection by the detection device.

Furthermore, a load control system according to the present disclosure includes: the load control device; and a load controlled by the load control device.

The detection device, the load control device, and the load control system according to the present disclosure achieve advantageous effects of increasing the accuracy of detecting a person.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Figure 1:
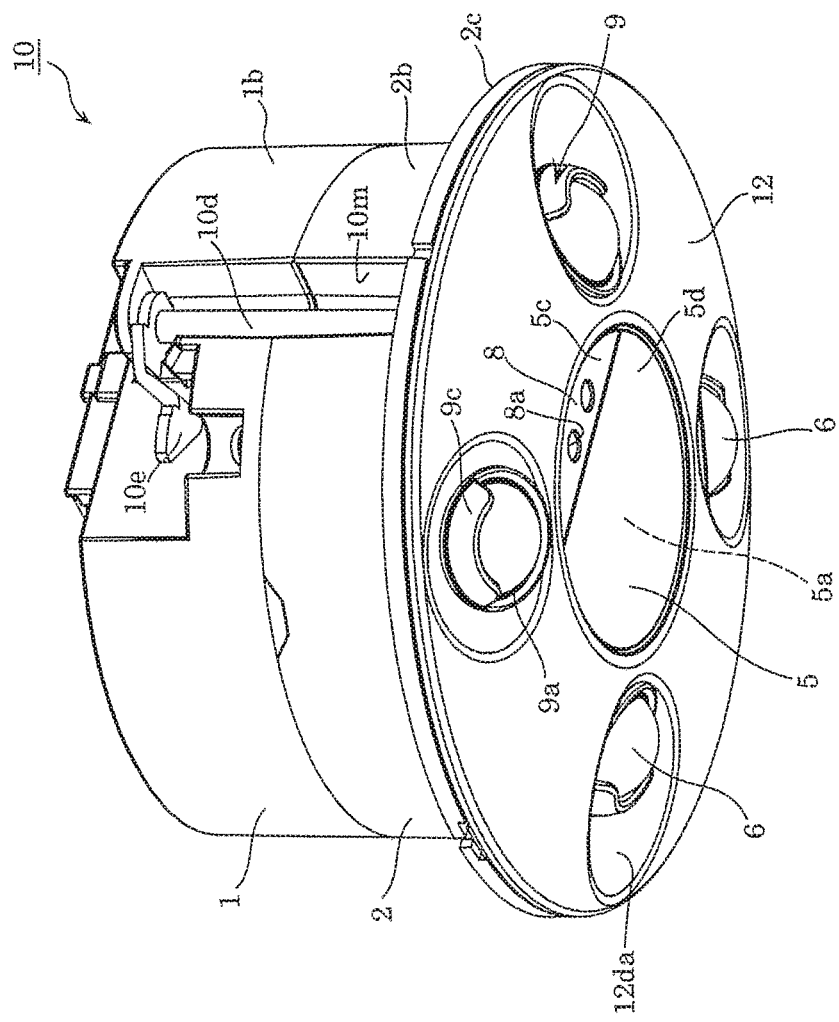
FIG. 1 is a perspective view illustrating a load control device according to Embodiment 1.

The following describes embodiments with reference to the drawings. The embodiments described herein are specific examples of the present disclosure. Thus, numerical values, shapes, elements, arrangement and connection of the elements, steps (processes), and the processing order of the steps described in the embodiments below are examples, and are not intended to limit the present disclosure. Among the elements in the embodiments below, an element which is not described in an independent claim can be added arbitrarily. The sizes and positional relationship of members illustrated in the drawings may be exaggerated in order to provide clear description. In the following description, with regard to the elements included in embodiments, a plurality of elements may be achieved by a single member and that member may serve as the plurality of elements, or the function of one member may be divided and achieved by a plurality of members.

Embodiment 1

The following describes load control device 10 according to the present embodiment, with reference to FIGS. 1 to 5. A description of load control system 30 which includes load control device 10 according to the present embodiment is given with reference to FIG. 9.

Figure 2:
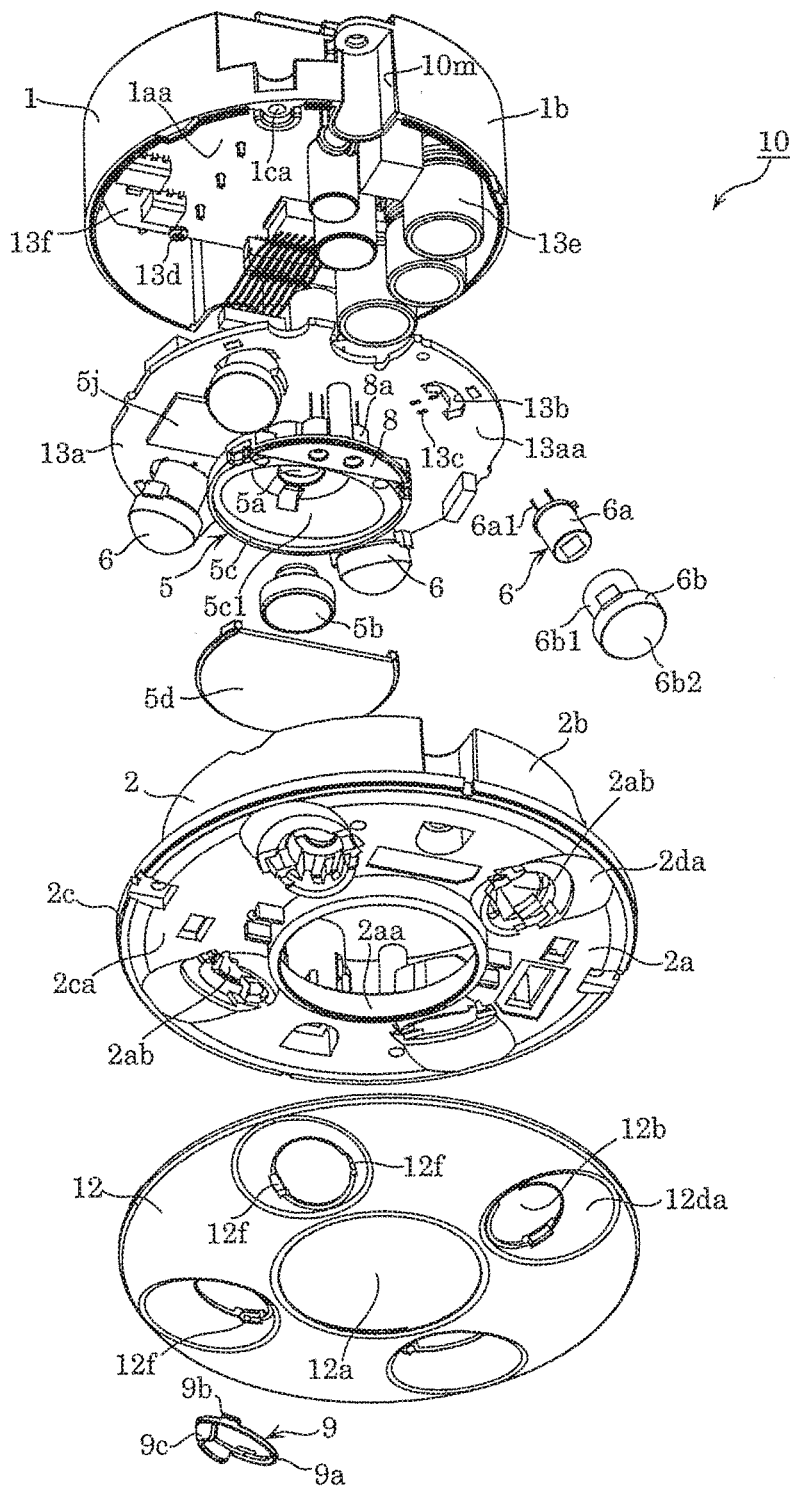
FIG. 2 is an exploded perspective view illustrating the load control device according to Embodiment 1.
Figure 3:
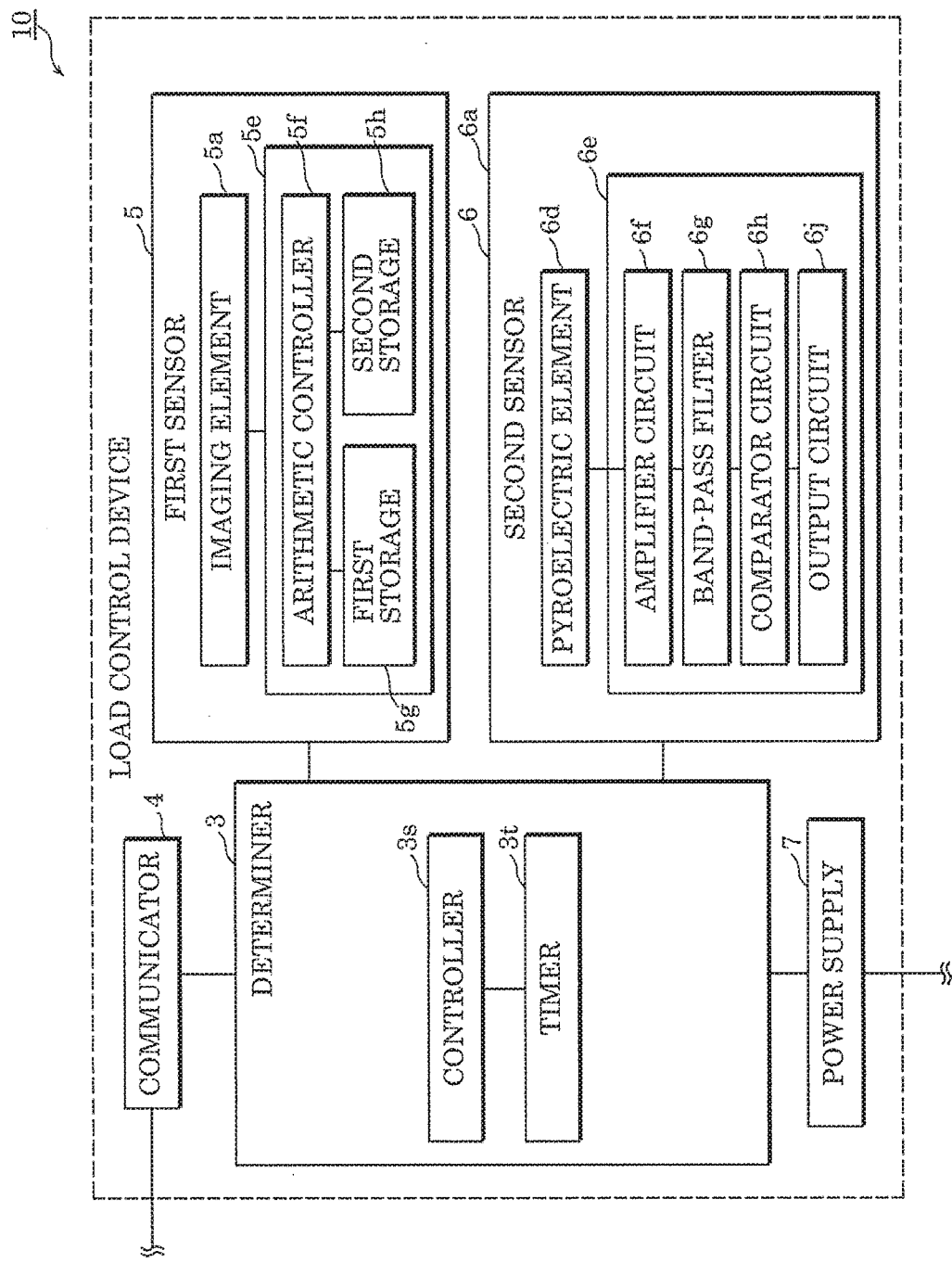
FIG. 3 is a block diagram illustrating the load control device according to Embodiment 1.

Load control device 10 according to the present embodiment includes casing 1 and lid 2 as illustrated in FIGS. 1 and 2. Casing 1 has a cylindrical shape with a closed end. Lid 2 is provided so as to close opening 1aa of casing 1. Lid 2 includes first sensor 5 and second sensors 6. First sensor 5 is provided in a center portion of lid 2 in plan view. Second sensors 6 are provided along the circumferential portion of lid 2 in plan view. Determiner 3 and communicator 4 illustrated in FIG. 3 are housed in the inner space surrounded by casing 1 and lid 2. Determiner 3 determines whether a person is present, based on a first sensor signal from first sensor 5 and second sensor signals from second sensors 6. Communicator 4 transmits a control signal to a control target, based on the result of determination by determiner 3. First sensor 5 includes imaging element 5a. Imaging element 5a captures an image of first detection range 10aa illustrated in FIGS. 4 and 5. First sensor 5 detects whether a person is present in first detection range 10aa, based on image data generated by imaging element 5a through image capturing, and outputs a first sensor signal. Second sensors 6 each include infrared sensor 6a which may be referred to as a light receiver. Infrared sensor 6a detects infrared radiation in second detection range 10ba. Second sensor 6 detects whether a person is present in second detection range 10ba, based on the infrared radiation detected by infrared sensor 6a, and outputs a second sensor signal. First detection range 10aa overlaps second detection ranges 10ba of second sensors 6. Load control device 10 includes hoods 9 which adjust second detection ranges 10ba of second sensors 6 by blocking part of infrared radiation directed to second sensors 6 so that first detection range 10aa and second detection ranges 10ba match.

Load control device 10 according to the present embodiment can detect a person with higher accuracy by including hoods 9 which block part of infrared radiation directed to second sensors 6.

The first briefly describes the entirety of load control system 30.

Figure 9:
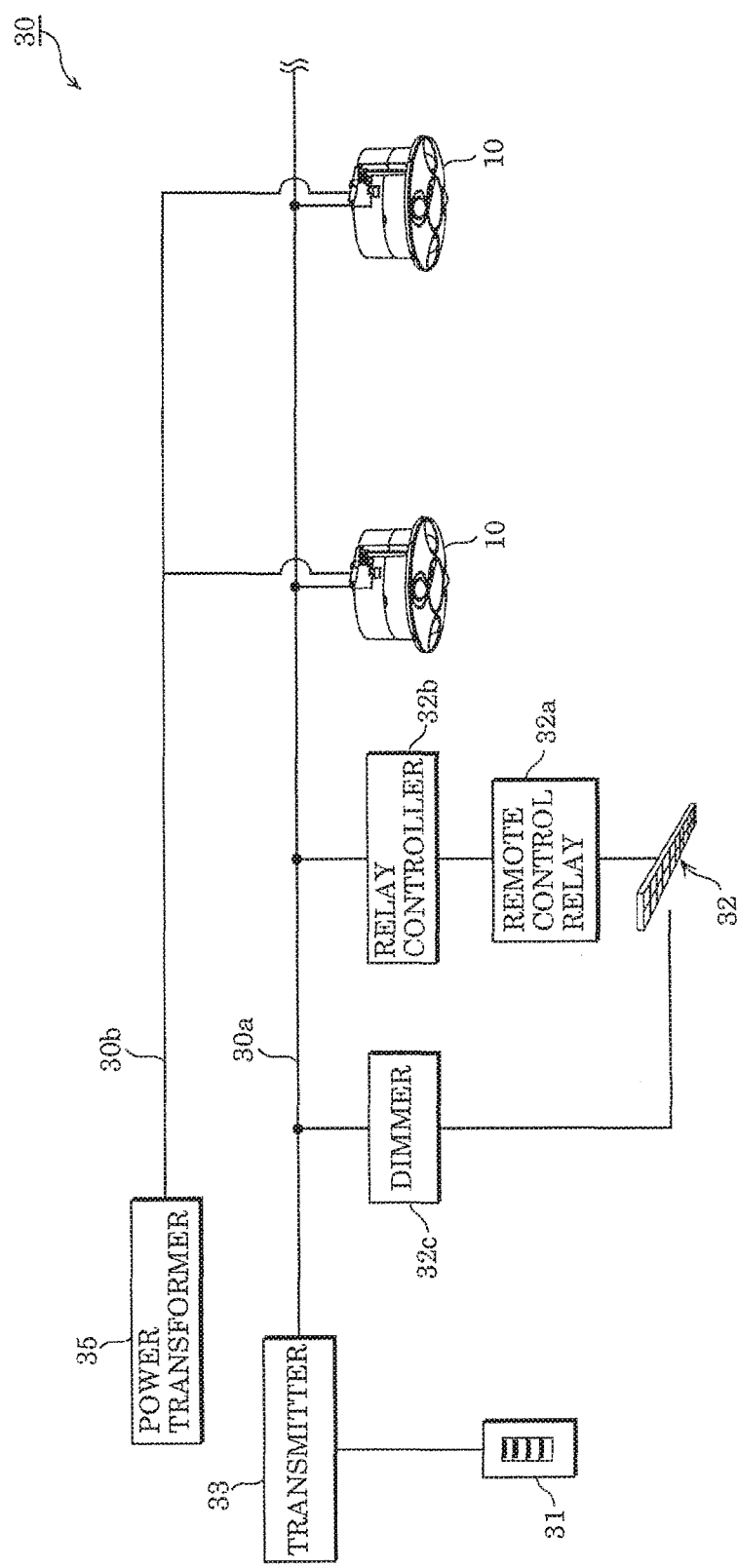
FIG. 9 is a block diagram illustrating a load control system includes the load control device according to Embodiment 1.

Load control system 30 includes load control devices 10, switch 31, lighting apparatuses 32, transmitter 33, and power transformer 35, as illustrated in FIG. 9. In load control system 30, plural load control devices 10, switch 31, plural lighting apparatuses 32, and transmitter 33 are electrically connected to one another via transmission line 30a. In load control system 30, power transformer 35 and load control devices 10 are electrically connected to one another via power source line 30b.

Switch 31 is configured to control turning on and off and dimming lighting apparatuses 32. Switch 31 is configured to transmit control signals for turning on and off and dimming lighting apparatuses 32, via transmitter 33 by multiplexing. Switch 31 can control turning on and off and dimming certain lighting apparatus 32 among plural lighting apparatuses 32, by transmitting a control signal by multiplexing. The control signal includes address information which identifies lighting apparatus 32 which is to be controlled and control information for controlling lighting apparatus 32. In other words, load control system 30 is configured to transmit a control signal through two-wire transmission line 30a by multiplexing.

Lighting apparatuses 32 each include remote control relay 32a, relay control terminal unit 32b, and dimming terminal unit 32c. In the following, relay control terminal unit 32b is referred to as relay controller 32b, and dimming terminal unit 32c is referred to as dimmer 32c. Relay controller 32b controls remote control relay 32a in response to a control signal from transmitter 33. Relay controller 32b has an address determined for the controller. Relay controller 32b controls remote control relay 32a, based on the content of a control signal which includes address information indicating the same address as the address predetermined for the controller, among the control signals transmitted by multiplexing. Remote control relay 32a includes a contact for switching between on and off of lighting apparatus 32. Remote control relay 32a switches between on and off of lighting apparatus 32, based on an indication from relay controller 32b. Dimmer 32c has an address determined for the dimmer. Dimmer 32c extracts a control signal which includes address information indicating the same address as the address predetermined for the dimmer, among the control signals transmitted by multiplexing. Dimmer 32c controls the dimming of lighting apparatus 32, based on the content of the control signal. Lighting apparatus 32 functions as a lighting apparatus having a communication function, which includes remote control relay 32a, relay controller 32b, and dimmer 32c.

Transmitter 33 is configured to transmit various control signals to plural lighting apparatuses 32 through two-wire transmission line 30a. Transmitter 33 includes a transmission circuit which transmits a control signal. Transmitter 33 is configured to prevent interference of control signals from plural load control devices 10, and transmit the control signals to lighting apparatuses 32. Single transmitter 33 is configured to control, by the transmitter itself, 256 circuits of load devices, for example. Power transformer 35 is configured to lower, for example, a voltage of commercial alternating current power to a predetermined voltage, and output the power. Power transformer 35 supplies load control devices 10 with power for driving load control devices 10. Load control system 30 may include a lighting controller which controls plural lighting apparatuses 32. The lighting controller turns lighting apparatuses 32 on and off by controlling lighting apparatuses 32 in conjunction with load control devices 10, for instance.

The following describes basic operation of load control device 10 in load control system 30.

For example, if load control device 10 determines, based on a first sensor signal from first sensor 5 and a second sensor signal from second sensor 6, that a person is staying in the detection range of load control device 10 while lighting apparatus 32 is on, load control device 10 maintains lighting apparatus 32 on. If load control device 10 is to maintain certain lighting apparatus 32 on, load control device 10 may output, from communicator 4, a control signal for maintaining lighting apparatus 32 on, or may not output a control signal. Load control device 10 outputs, from communicator 4, a control signal for dimming certain lighting apparatus 32 if determiner 3 determines that a person is moving out of the detection range of load control device 10, based on both a first sensor signal and a second sensor signal. Dimming of lighting apparatus 32 is controlled based on a control signal which includes address information indicating the same address as the address predetermined for dimmer 32c of the lighting apparatus. If load control device 10 determines that a person is moving out of the detection range of load control device 10, load control device 10 dims, for example, certain lighting apparatus 32 in the on state with 100% output to 50% output.

If load control device 10 determines that a person is not present, based on a first sensor signal from first sensor 5 and a second sensor signal from second sensor 6, for example, load control device 10 outputs, from communicator 4, a control signal for turning off certain lighting apparatus 32. Relay controller 32b of certain lighting apparatus 32 controls remote control relay 32a, based on a control signal which includes address information indicating the same address as the address predetermined for relay controller 32b. Remote control relay 32a turns off lighting apparatus 32, based on an indication from relay controller 32b. In load control system 30 which includes load control devices 10 according to the present embodiment, a load device which is a control target controlled by load control device 10 is lighting apparatus 32. Examples of the control target include not only lighting apparatus 32, but also various load devices such as a ventilation fan and an air conditioner.

The following describes a specific structure of load control device 10.

Casing 1 of load control device 10 includes a bottom plate and cylinder 1b. Casing 1 has a cylindrical shape with a closed end, which is formed by the bottom plate and cylinder 1b, as illustrated in FIG. 2. Lid 2 includes bottom portion 2a and cylinder portion 2b. Lid 2 has a cylindrical shape with a closed end, which is formed by bottom portion 2a and cylinder portion 2b. In a state where casing 1 and lid 2 are fitted, load control device 10 forms a box which is hollow inside. Load control device 10 has a cylindrical shape, in a state where casing 1 and lid 2 are fitted. Casing 1 has a pair of through holes 1ca in the circumferential portion in plan view. Casing 1 has a structure in which first screws inserted in through holes 1ca are tightened in screw holes of lid 2. Casing 1 can be formed using electrically insulating resin material such as urea resin, for example. Lid 2 can be formed using electrically insulating resin material, such as urea resin, for example. Casing 1 and lid 2 may be formed using the same material or different materials.

Lid 2 has first window hole 2aa and second window holes 2ab. Lid 2 has one first window hole 2aa in the center portion of bottom portion 2a. First window hole 2aa passes through bottom portion 2a in the thickness direction of bottom portion 2a. The central axis of first window hole 2aa is in the direction perpendicular to outer bottom surface 2ca of bottom portion 2a. First window hole 2aa has a circular shape in plan view. Lid 2 has four second window holes 2ab around first window hole 2aa. The central axis of second window holes 2ab is inclined outward relative to the line perpendicular to outer bottom surface 2ca of bottom portion 2a. Outer bottom surface 2ca of bottom portion 2a has depressed portions 2da around second window holes 2ab, which are stretching outward. Lid 2 has, on the bottom portion 2a side, flange portion 2c protruding outward from the outer circumference of cylinder portion 2b.

Load control device 10 includes plate 12 which covers outer bottom surface 2ca of lid 2. Plate 12 has a circular shape. Plate 12 has first opening 12a in the center portion corresponding to first window hole 2aa. Plate 12 has second openings 12b in the circumferential portion corresponding to second window holes 2ab. Plate 12 has a pair of holding grooves 12f at the edge of each second opening 12b. Each pair of holding grooves 12f are formed to hold hood 9 onto plate 12. Hoods 9 each include base 9a, claw portions 9b, and shield portion 9c. Base 9a has a ring shape. The ring shape of base 9a is slightly smaller than the external shape of dome portion 6b2 in plan view. Claw portions 9b are protruding outward from the outer circumference of base 9a. A pair of claw portions 9b are disposed on base 9a being opposed to one another. Shield portion 9c is formed protruding from base 9a to cover a portion of second sensor 6. Shield portion 9c may be formed so as to block infrared radiation. Hood 9 is formed using resin material, thus allowing claw portions 9b and base 9a to be elastic. Hood 9 can be attached to plate 12 by deforming claw portions 9b and base 9a so that claw portions 9b are hooked on holding grooves 12f. Hood 9 can be detached from plate 12 by deforming claw portions 9b and base 9a so that claw portions 9b are pulled out from holding grooves 12f. Plate 12 has hollows 12da around second openings 12b in the circumferential portion corresponding to depressed portions 2da. Plate 12 serves as a face plate of load control device 10. First sensor 5 of load control device 10 is exposed from first opening 12a of plate 12. Second sensors 6 of load control device 10 are exposed from second openings 12b of plate 12.

First sensor 5 includes lens part 5b, lens holder 5c, and cover plate 5d, in addition to imaging element 5a. For example, a solid state imaging element such as a complementary metal oxide semiconductor (CMOS) image sensor or a charge coupled device (CCD) image sensor can be used as imaging element 5a. Imaging element 5a is configured so as to obtain image data. Lens part 5b is provided in front of imaging element 5a. Lens part 5b includes, for example, a lens which condenses light, and an adjuster which relatively displaces imaging element 5a and the lens. The adjuster can be formed using a permanent magnet which holds the lens, and a magnet coil which moves the permanent magnet. Lens part 5b moves the lens by adjusting a current flowing through a coil, thus adjusting a focal point with respect to imaging element 5a. Lens holder 5c holds lens part 5b. Lens holder 5c has a ring shape. Cover plate 5d is provided so as to close third opening 5c1 of ring-shaped lens holder 5c. Cover plate 5d is disposed in front of lens part 5b. Cover plate 5d is light-transmissive. Cover plate 5d is colored, thus making it difficult to see inside of first sensor 5 from the outside. Lens holder 5c includes indicator 8 at a portion of the ring shape in plan view. Indicator 8 has at least one light emitting diode 8a. Light emitting diode 8a shows the operating state of load control device 10, based on the color of emitted light and the illumination state of the diode.

Second sensors 6 each include sensor cover 6b, in addition to infrared sensor 6a. Infrared sensor 6a has a cylindrical shape. Infrared sensor 6a has three terminals 6a1 protruding in the axial direction. Sensor cover 6b has tube portion 6b1 and dome portion 6b2. Tube portion 6b1 has a cylindrical shape. Dome portion 6b2 covers tube portion 6b1. Dome portion 6b2 has a lens which condenses infrared radiation. Tube portion 6b1 and dome portion 6b2 of sensor cover 6b are integrally formed. Sensor cover 6b can be formed using polyethylene resin, for example. Sensor cover 6b covers infrared sensor 6a on the side opposite to terminals 6a1. In second sensor 6, infrared sensor 6a detects, through sensor cover 6b, infrared radiation emitted by a person. In order to secure a predetermined viewing angle, second sensor 6 has sensor cover 6b protruding outward relative to outer bottom surface 2ca of lid 2.

Second sensors 6 are mounted on first circuit board 13a via lid 2. FIG. 2 illustrates that second sensors 6 are directly mounted on first circuit board 13a, to facilitate a description. First circuit board 13a has a disc-like shape in plan view. First circuit board 13a includes first insertion holes 13b and second insertion holes 13c. First insertion holes 13b are formed into an arc shape in plan view. First insertion holes 13b are each formed to house a part of tube portion 6b1 of sensor cover 6b. Infrared sensors 6a are disposed so as to be partially in contact with first circuit board 13a. Terminals 6a1 of infrared sensors 6a are inserted in second insertion holes 13c. First circuit board 13a has three second insertion holes 13c for each second sensor 6. Second insertion holes 13c are each formed into an oval in plan view. Terminals 6a1 are inserted in second insertion holes 13c, being inclined relative to first surface 13aa of first circuit board 13a. First insertion holes 13b and second insertion holes 13c of first circuit board 13a allow infrared sensors 6a to be mounted, infrared sensors 6a being inclined relative to first surface 13aa of first circuit board 13a. Infrared sensors 6a each have a light-receiving surface for receiving infrared radiation, and an optical axis that is inclined toward the circumference from the center portion of lid 2 in plan view, the optical axis being perpendicular to the light-receiving surface.

On first surface 13aa of first circuit board 13a, electronic device 5j such as a field-programmable gate array (FPGA) is mounted, in addition to imaging element 5a, light emitting diode 8a, and infrared sensors 6a. Mounting components such as an integrated circuit (IC) and a microcomputer are mounted on a second surface of first circuit board 13a opposite first surface 13aa. Wiring is formed into a predetermined shape on first circuit board 13a so as to establish electrical connection with imaging element 5a, light emitting diode 8a, infrared sensors 6a, electronic device 5j, and various mounting components. In load control device 10, determiner 3 and communicator 4 are achieved using electronic device 5j and such mounting components. First circuit board 13a is fixed to lid 2 with screws.

First circuit board 13a is electrically connected with second circuit board 13f. Second circuit board 13f has a disc-like shape. Various electronic components 13e are mounted on second circuit board 13f. Examples of electronic components 13e include an electrolytic condenser, a photocoupler, a thermo sensitive register, a transistor, a varistor, and a diode. Second circuit board 13f forms a direct current-direct current (DC-DC) converter, using various electronic components 13e mounted thereon. Second circuit board 13f forms a power supply circuit which supplies power to first circuit board 13a. Second circuit board 13f is fixed to casing 1 with second screw 13d. Second circuit board 13f includes plural terminals. In load control device 10, plural terminals are exposed on a side of casing 1 opposite lid 2. The terminals can function as feed terminals which supply power to load control device 10. The terminals can function as communication terminals which transmit control signals from communicator 4.

Figure 4:
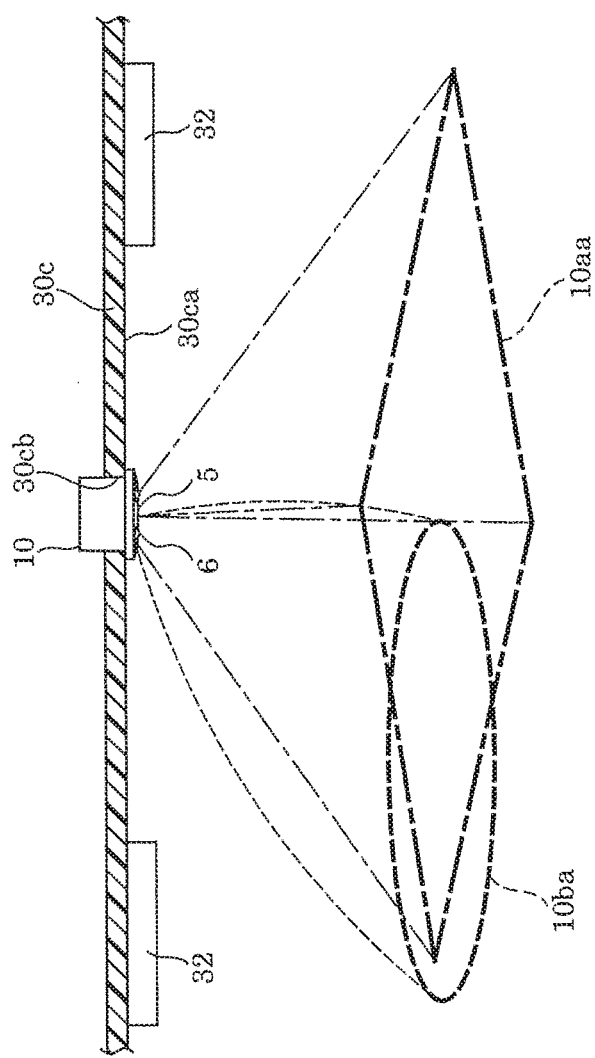
FIG. 4 is a perspective view illustrating a first detection range and a second detection range of the load control device according to Embodiment 1.

Load control device 10 includes tightening screw 10d and metal clip fitting 10e. Tightening screw 10d is provided along groove 10m along casing 1 and lid 2. Metal clip fitting 10e is formed so as to allow tightening screw 10d to be fit in the metal clip fitting. Load control device 10 is attached to installation surface 30ca of, for instance, ceiling material 30c of a building, as illustrated in FIG. 4. Load control device 10 is disposed, being embedded in through port 30cb provided in ceiling material 30c. Flange portion 2c is formed so as to be in contact with installation surface 30ca in a state where load control device 10 is embedded in through port 30cb in ceiling material 30c. Flange portion 2c and metal clip fitting 10e attach load control device 10 into ceiling material 30c using tightening screw 10d and metal clip fitting 10e. Load control device 10 is disposed being attached into ceiling material 30c so that first sensor 5 and second sensors 6 detect a space vertically below construction surface 30ca.

The following describes the circuit configuration of load control device 10 with reference to FIG. 3.

Load control device 10 includes power supply 7, in addition to determiner 3, communicator 4, first sensor 5, and second sensors 6. Load control device 10 is a detection device which detects whether a person is present, and further controls a load via communicator 4.

Power supply 7 is achieved by the DC-DC converter formed on second circuit board 13f. Power supply 7 is connected to commercial power, for example, and supplies power to determiner 3, communicator 4, first sensor 5, and second sensors 6.

Determiner 3 includes controller 3s and timer 3t. Determiner 3 receives a first sensor signal from first sensor 5 and second sensor signals from second sensors 6. Controller 3s is configured to cause communicator 4 to output, based on a first sensor signal and a second sensor signal, a control signal for controlling turning on and off and dimming lighting apparatus 32. Controller 3s can be achieved by, for example, a microcomputer in which a central processing unit (CPU), for instance, is used. Timer 3t measures time. Communicator 4 outputs various control signals, based on indications from determiner 3. Communicator 4 is configured to transmit a control signal by multiplexing.

Controller 3s causes communicator 4 to output a control signal for turning off lighting apparatus 32 after a predetermined time period measured by timer 3t has elapsed since controller 3s has determined that a person is not present, based on a first sensor signal and a second sensor signal. Controller 3s resets the counting by timer 3t if controller 3s determines, based on a first sensor signal and a second sensor signal, that a person is present while timer 3t is measuring time. Load control device 10 can maintain lighting apparatus 32 on until timer 3t completes decrementing time newly after the counting is reset.

First sensor 5 includes image processor 5e, in addition to imaging element 5a. Image processor 5e includes arithmetic controller 5f, first storage 5g, and second storage 5h. Arithmetic controller 5f performs arithmetic processing on image data generated by imaging element 5a through image capturing. Arithmetic controller 5f is achieved using a FPGA and a digital signal processor (DSP). A semiconductor element which can perform digital image processing at high speed, such as an advanced image processor, may be used for arithmetic controller 5f, instead of the DSP.

First storage 5g stores image data generated by imaging element 5a through image capturing. A mass storage device is used for first storage 5g so that high volume image data can be stored. For example, a volatile memory having comparatively large storage capacity such as dynamic random access memory (DRAM) can be used for first storage 5g. Second storage 5h stores in advance shape data indicating contours of a person viewed from the ceiling material 30c side, for instance. Shape data indicating contours of a person is used to perform image discrimination processing for distinguishing between a person and an object other than a person. Second storage 5h is included separately from first storage 5g. A non-volatile memory which can transfer shape data at a comparatively high speed, such as synchronous DRAM (SDRAM), is used for second storage 5h.

Image processer 5e temporarily stores into first storage 5g image data generated by imaging element 5a through image capturing. Image processer 5e reads image data stored in first storage 5g into arithmetic controller 5f, as appropriate. Image processer 5e reads shape data indicating contours of a person from second storage 5h into arithmetic controller 5f, as appropriate. Arithmetic controller 5f performs image differentiation processing on the read image data. In the image differentiation processing, as a difference in the background, a current image based on current image data captured by imaging element 5a is compared with a background image based on background data captured in advance by imaging element 5a before a person enters first detection range 10aa. Background data may be stored in first storage 5g or in second storage 5h. Arithmetic controller 5f compares a current image with a background image, and generates a differential image based on a difference per pixel. In the image differentiation processing, a differential image may be generated based on a temporal difference obtained by comparing two image data that are read by imaging element 5a at different times, rather than based on a difference in background. Arithmetic controller 5f performs processing for extracting differential pixels from a differential image obtained by comparing a current image with a background image and binarizing luminance values. In the processing for extracting differential pixels, a luminance value of a pixel which does not change between a current image and a background image is below a predetermined threshold. In the processing for extracting differential pixels, if a person is present, there is a change between a current image and a background image. In the processing for extracting differential pixels, a luminance value of a pixel, which changes between a current image and a background image is greater than or equal to a predetermined threshold.

Arithmetic controller 5f performs processing for extracting differential pixels, and thereafter performs recognition processing on the differential pixels. In the recognition processing, image discrimination processing by shape pattern recognition for determining how much a shape of a contour formed by a group of the extracted differential pixels matches shape data indicating a contour of a person prestored in second storage 5h. Arithmetic controller 5f can determine whether the shape of the extracted contour corresponds to a person or not, by determining a percentage at which the shape of the extracted contour matches prestored shape data indicating a contour of a person. Arithmetic controller 5f can extract the contour shape using, for example, a Sobel filter, a Prewit filter, or the like, as recognition processing on the differential pixels.

Arithmetic controller 5f outputs a first sensor signal indicating that a person is present, upon the detection of presence of a person by image discrimination processing. Each time imaging element 5a outputs image data, first sensor 5 compares image data with a background image, thus appropriately detecting whether a person is present. Load control device 10 can detect whether a person is present even if only one person who is not moving is present.

Infrared sensor 6a of each of second sensors 6 includes pyroelectric element 6d and signal processing circuit 6e. Pyroelectric element 6d detects infrared radiation emitted by a person. Signal processing circuit 6e includes amplifier circuit 6f, band-pass filter 6g, comparator circuit 6h, and output circuit 6j. Amplifier circuit 6f amplifies a signal from pyroelectric element 6d. Band-pass filter 6g eliminates an unnecessary frequency component which can result in noise, from the amplified signal. Comparator circuit 6h determines whether a signal from which an unnecessary frequency component has been eliminated exceeds a predetermined threshold. If the signal exceeds the predetermined threshold, output circuit 6j outputs a second sensor signal indicating that a person is present. Specifically, signal processing circuit 6e amplifies a signal from pyroelectric element 6d, and compares the amplified signal with the threshold. Infrared sensor 6a outputs a second sensor signal via terminals 6a1 to determiner 3 if the signal from pyroelectric element 6d is greater than the threshold.

Load control device 10 determines whether a person is present, based on a first detection signal from first sensor 5 and second detection signals from second sensors 6, and controls turning on and off and dimming lighting apparatuses 32 individually. In particular, first sensor 5 detects whether a person is present, based on a difference of image data, and thus load control device 10 can determine whether a person is in first detection range 10aa and determine that a person has moved out of first detection range 10aa. Load control device 10 can dim lighting apparatus 32 while a person is passing through first detection range 10aa, and turns on lighting apparatus 32 only when a person stays in first detection range 10aa.

First sensor 5 detects whether a person is present, based on image data generated by imaging element 5a through image capturing. First detection range 10aa needs to have predetermined brightness to allow imaging element 5a of first sensor 5 to obtain image data. Infrared sensors 6a detect whether a person is present, based on infrared radiation emitted by a person, and thus second sensors 6 can detect whether a person is present, independently of brightness.

In load control device 10, first sensor 5 obtains image data at predetermined time intervals. Load control device 10 can detect the brightness around the load control device, using first sensor 5. First sensor 5 calculates, as ambient brightness, an illuminance from an average value of the entire image data generated by imaging element 5a through image capturing. In other words, first sensor 5 also functions as an illuminance sensor. If the brightness detected by first sensor 5 is greater than a predetermined illuminance, determiner 3 determines whether a person is present, based on a first sensor signal and a second sensor signal. A threshold of the predetermined illuminance can be set to 20 lx, for example, although this value depends on image capturing performance of imaging element 5a. The threshold of illuminance can be stored in second storage 5h, for example.

If the ambient brightness around load control device 10 is less than the predetermined illuminance, determiner 3 determines, based only on a second sensor signal from second sensor 6, whether a person is present, and causes communicator 4 to output a control signal. Independently of the ambient brightness, load control device 10 may determine, based on a first detection signal and a second detection signal, whether a person is present, and output a control signal from communicator 4.

The following briefly describes first detection range 10aa and second detection ranges 10ba of load control device 10 according to the present embodiment.

Figure 5:
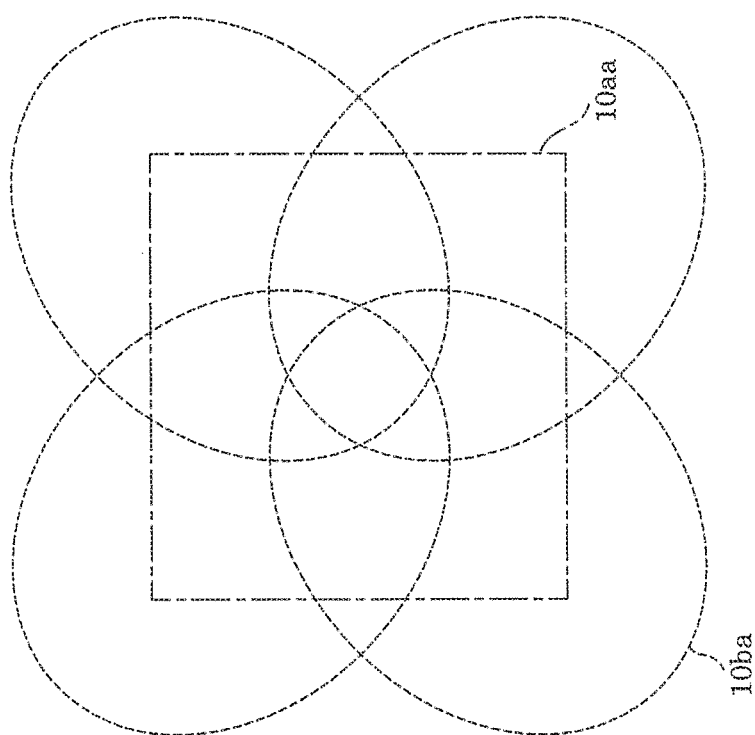
FIG. 5 is a plan view illustrating the first detection range and the second detection ranges of the load control device according to Embodiment 1.

For example, first detection range 10aa is formed in a quadrangular pyramid having first sensor 5 as a vertex, as illustrated in FIG. 4. Second detection range 10ba is formed in an oblique circular cone having second sensor 6 as a vertex. FIG. 4 illustrates second detection range 10ba where one of four second sensors 6 detects presence of a person, as an example. On the floor, first detection range 10*aa* of first sensor 5 is formed in a rectangular shape, as illustrated in FIG. 5.

Second detection range 10*ba* of second sensor 6 is formed into an oval shape on the floor so as to overlap first detection range 10*aa* of first sensor 5. First sensor 5 and second sensors 6 are disposed such that the longitudinal direction of each of second detection ranges 10*ba* on the floor is along a diagonal line of first detection range 10*aa* on the floor. Load control device 10 is disposed such that the entirety of four second detection ranges 10*ba* includes first detection range 10*aa* on the floor.

First sensor 5 can be configured to switch between on and off of the detection function of detecting whether a person is present, for each of a plurality of regions into which first detection range 10*aa* is divided. Load control device 10 can turn off, in advance, the detection function in a specific region where detection of presence of a person is not necessary, such as a region where a pillar, for example, is present, depending on where load control device 10 is disposed. First sensor 5 can store the regions into second storage 5*h*. Load control device 10 may have a configuration in which divided regions are appropriately determined from the outside using a remote-control device.

Each of the regions overlaps at least one of second detection ranges 10*ba* of second sensors 6. When load control device 10 controls, for each of the regions, whether to turn on or off the detection function in the region, load control device 10 turns on or off the detection function in the region which is superposed on at least one of second detection ranges 10*ba* of second sensors 6. Once load control device 10 turns off the detection function in a region, load control device 10 does not detect a person even if a person is present in the region in which the detection function is off.

In load control device 10, if a region in which the detection function is off overlaps second detection range 10*ba*, first sensor 5 does not detect whether a person is present, whereas second sensor 6 detects whether a person is present. If the ambient brightness is sufficient, load control device 10 determines whether a person is present, based on a logical product of a first sensor signal and a second sensor signal. If the ambient brightness is greater than the predetermined illuminance, determiner 3 performs signal processing based on a logical product of a first sensor signal and a second sensor signal, thus determining whether a person is present. Yet, determiner 3 does not determine that a person is present even if second sensor 6 detects presence of a person in a region in which the detection function of first sensor 5 is off.

If the ambient brightness is insufficient, load control device 10 determines whether a person present, based on only a second sensor signal from second sensor 6. For each of regions into which first detection range 10*aa* of first sensor 5 is divided, according to whether the detection function is on or off in the region, controller 3*s* of load control device 10 automatically controls on and off of second sensor 6 which detects presence of a person in second detection range 10*ba* that overlaps the region, when load control device 10 determines regions. If controller 3*s* sets the detection function in a certain region to off, load control device 10 can control and turn off the function of second sensor 6 corresponding to the region in which the detection function is determined to be off. If controller 3*s* sets the detection function in a certain region to off, load control device 10 may turn off second sensor 6 corresponding to the region in which the detection function is set to off, by negating a second sensor signal from second sensor 6. Thus, load control device 10 may control on and off of second sensor 6 by controlling the power supply to second sensor 6 or by determiner 3 asserting or negating a second sensor signal from second sensor 6.

Second sensors 6 are provided along the circumferential portion of lid 2 such that first detection range 10*aa* of first sensor 5 and second detection ranges 10*ba* of second sensors 6 overlap. However, first detection range 10*aa* of first sensor 5 is formed in a rectangular shape on the floor, whereas second detection range 10*ba* of each of second sensors 6 is formed in an oval shape on the floor. In load control device 10, different sensor elements are used for first sensor 5 and second sensors 6, and thus it is not easy to make first detection range 10*aa* and second detection ranges 10*ba* match. For example, if load control device 10 is disposed in ceiling material 30*c* at 3.0-meter high, a quadrangular pyramid of first detection range 10*aa* of first sensor 5 may have a square bottom surface that is 5.4 meters on each side on the floor. For example, if load control device 10 is disposed in ceiling material 30*c* at 3.0-meter high, second sensors 6 may detect presence of a person within a range where the bottom surfaces of the oblique circular cones of second detection ranges 10*ba* are inscribed in a square that is 9.0 meters on each side on the floor.

In particular, if load control device 10 is attached to, for instance, a slanting ceiling, first detection range 10*aa* and second detection ranges 10*ba* of load control device 10 tend to be significantly different. In load control device 10 according to the present embodiment, second detection ranges 10*ba* of second sensors 6 can be adjusted by attaching hoods 9 such that first detection range 10*aa* and second detection ranges 10*ba* match on the floor.

Figure 6:
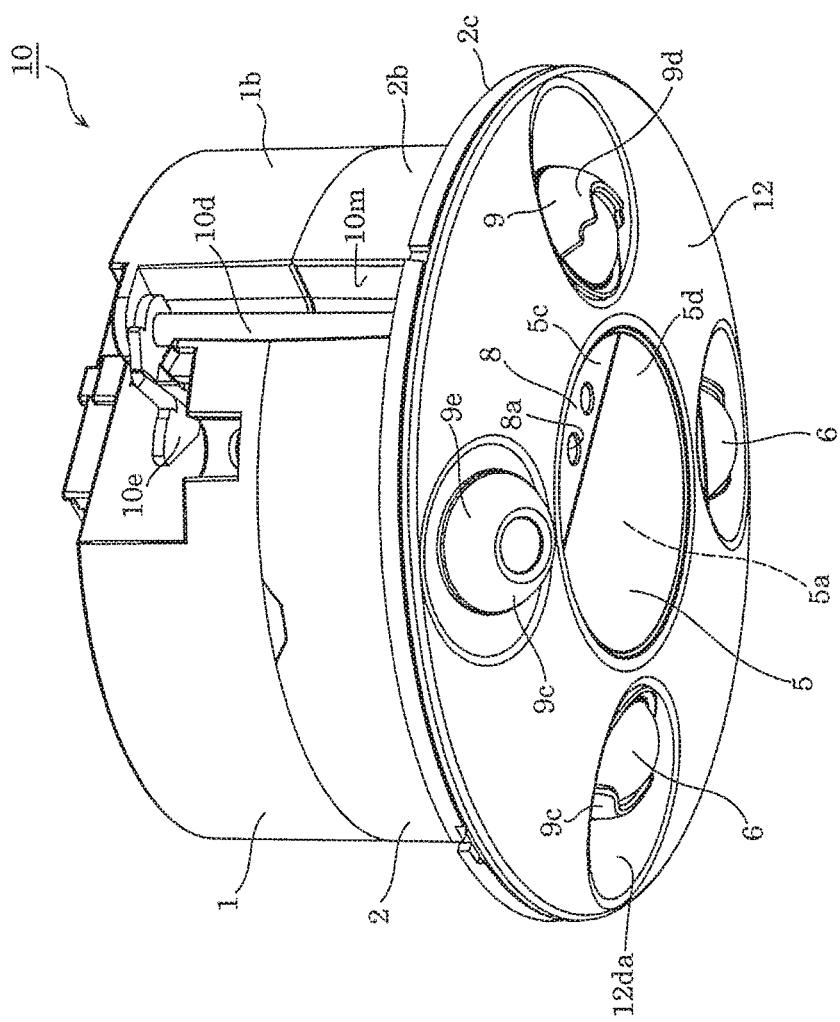
FIG. 6 is a perspective view illustrating a variation of the load control device according to Embodiment 1.
Figure 7:
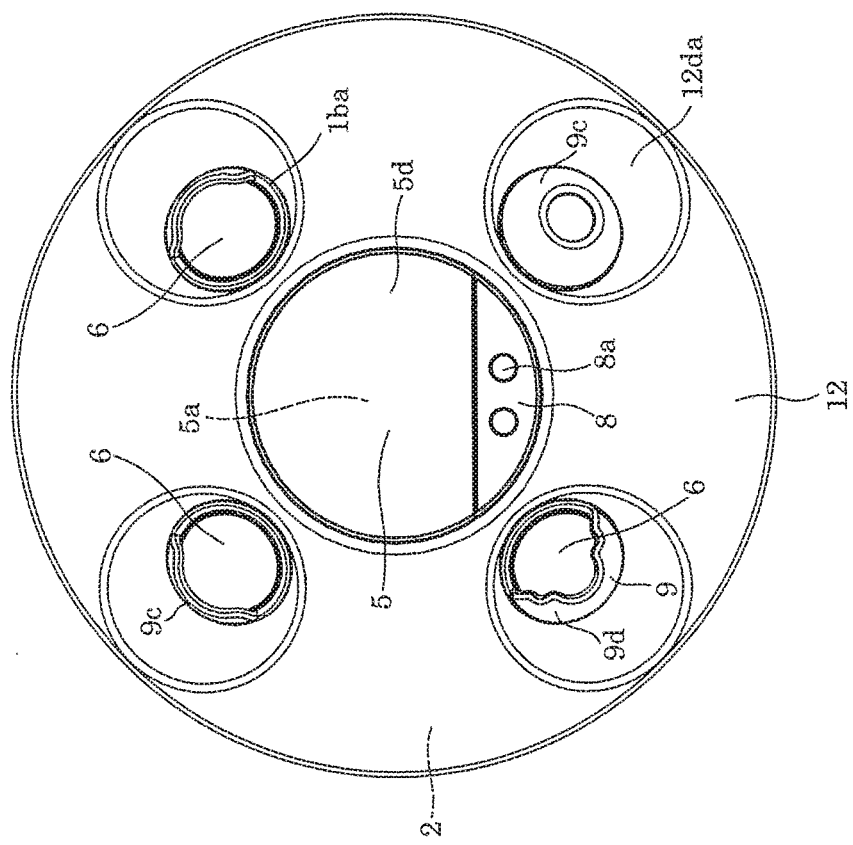
FIG. 7 is a front view illustrating the variation of the load control device according to Embodiment 1.
Figure 8:
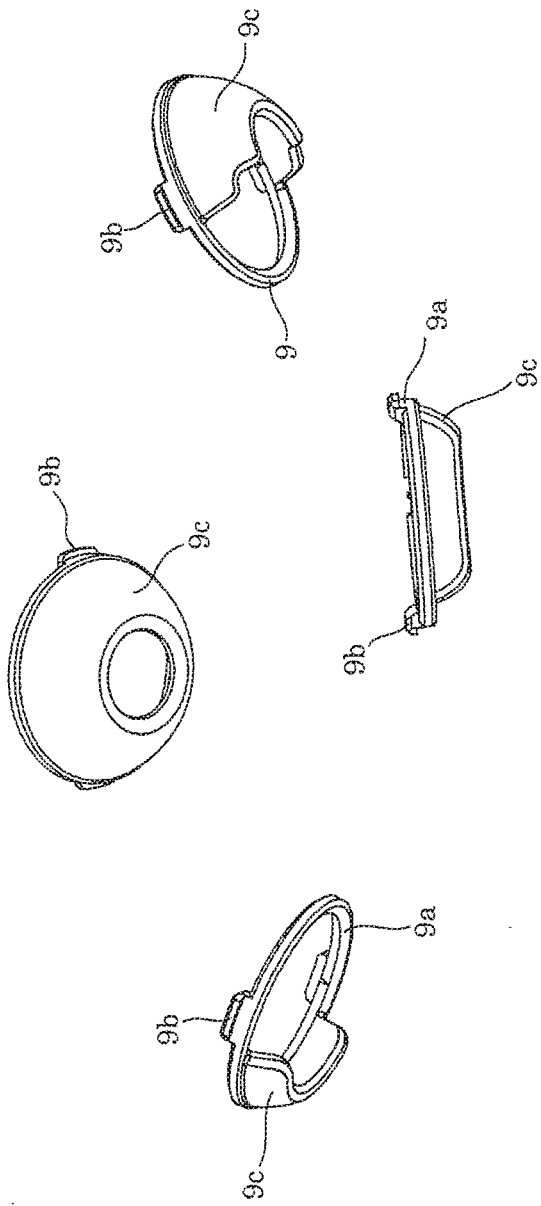
FIG. 8 is a perspective view illustrating principal parts of the variation of the load control device according to Embodiment 1.

Hoods 9 of load control device 10 according to the present embodiment are not limited to be each formed to have shield portion 9*c* that is a protruding portion of the perimeter of base 9*a*. As illustrated in FIGS. 6 to 8, load control device 10 according to a variation of the present embodiment may include hood 9 which has shield portion 9*d* that is a portion of the perimeter of base 9*a* protruding stepwise such that shield portion 9*d* is disposed over sensor cover 6*b*. As illustrated in FIGS. 6 to 8, load control device 10 according to a variation of the present embodiment may include hood 9 which has shield portion 9*e* that is protruding along the entire perimeter of base 9*a* such that shield portion 9*e* is disposed over sensor cover 6*b*.

Load control device 10 according to the present embodiment may include appropriately shaped hoods 9 which are attached to plate 12 such that first detection range 10*aa* and second detection ranges 10*ba* substantially match on the floor, according to the place where load control device 10 is installed and the detection range of load control device 10. Load control device 10 according to the present embodiment achieves further increased accuracy of detecting a person by making first detection range 10*aa* and second detection ranges 10*ba* similar, which constitute the detection range of load control device 10, such that first detection range 10*aa* and second detection ranges 10*ba* substantially match.

Note that load control device 10 illustrated in FIG. 3 may not be achieved as a single device, and may be divided into two devices. In other words, load control device 10 may include two devices, namely, a detection device which detects whether a person is present and a device (referred to as a load controller) which controls a load via communicator 4 according to a detection result. In this case, the detection device may mainly include determiner 3, first sensor 5, and second sensors 6 in FIG. 3. The load controller may mainly include controller 3s and communicator 4 in FIG. 3.

Furthermore, hoods 9 are provided one for each of second sensors 6, yet single hood 9 may be provided surrounding second sensors 6.

Embodiment 2

Figure 10:
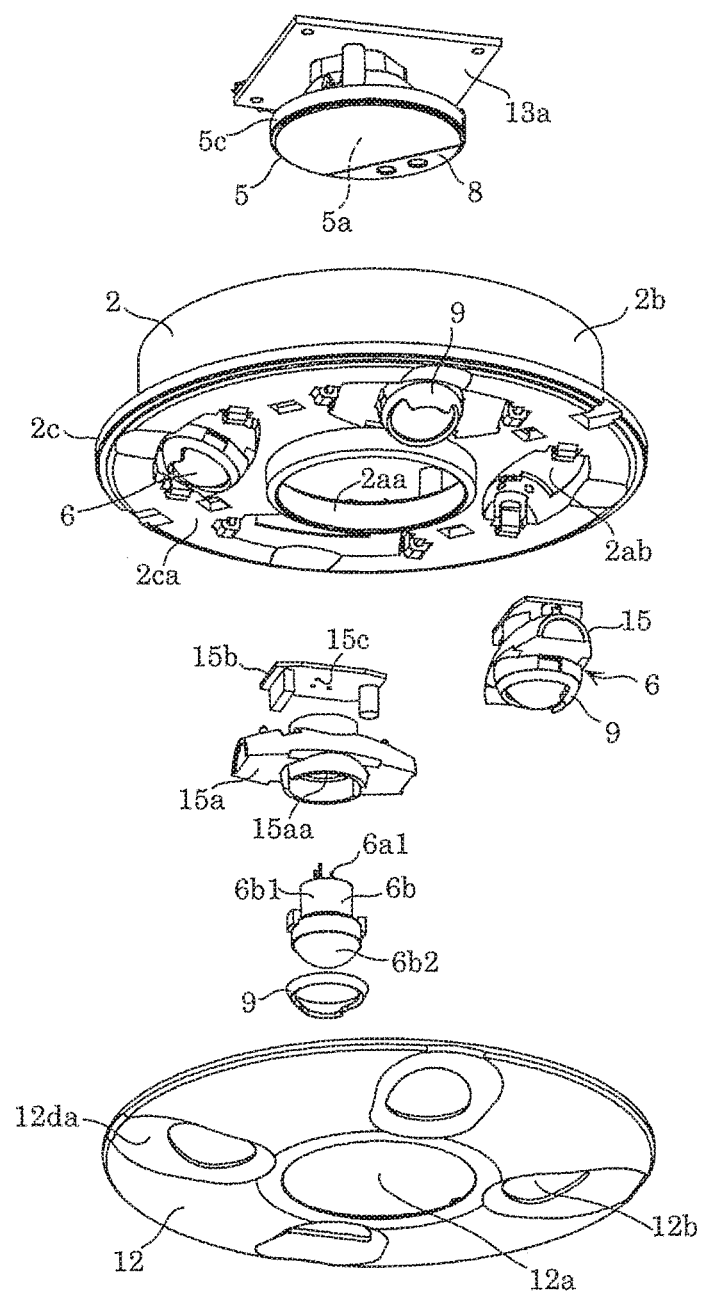
FIG. 10 is a perspective view illustrating a load control device according to Embodiment 2.
Figure 11:
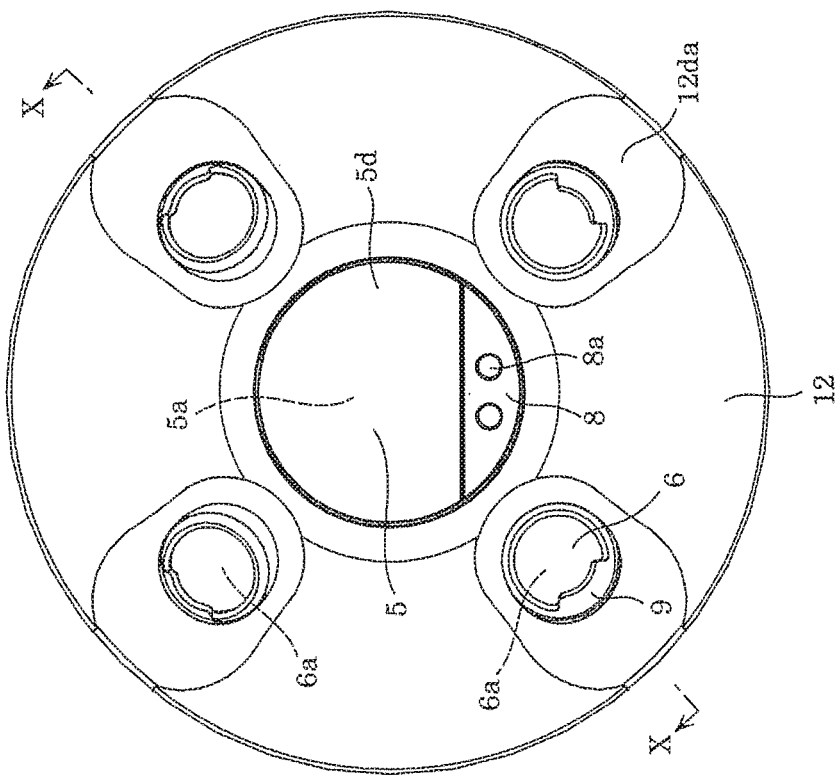
FIG. 11 is a plan view illustrating the load control device according to Embodiment 2.
Figure 12:
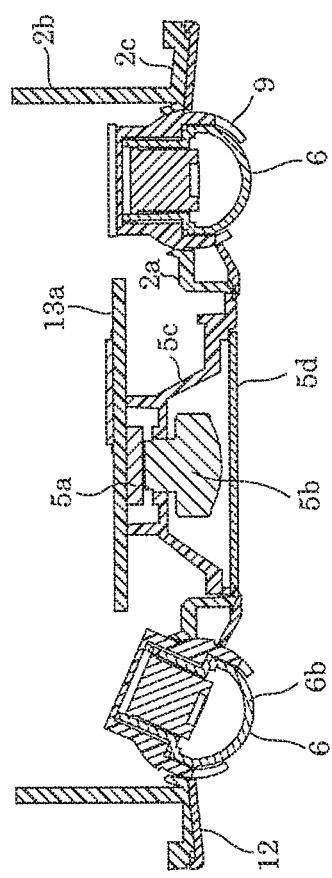
FIG. 12 is a cross-sectional view illustrating a cross section of a principal portion taken along XX in FIG. 11.

Instead of the structure of Embodiment 1 in which second sensors 6 are fixed to lid 2, load control device 10 according to the present embodiment has a structure in which second sensors 6 can be displaced relative to lid 2 as illustrated in FIGS. 10 to 12, which is a main difference from Embodiment 1. The same numerals are used for equivalent elements as those of Embodiment 1, and a description thereof is omitted as appropriate.

In load control device 10 according to the present embodiment, second sensors 6 are attached to movable parts 15 which displace second sensors 6 relative to lid 2. Hoods 9 are disposed on movable parts 15.

In load control device 10 according to the present embodiment, movable parts 15 on which hoods 9 are disposed allow second sensors 6 to displace relative to lid 2, thus making first detection range 10aa and second detection ranges 10ba similar, to further increase the accuracy of detecting a person.

Movable parts 15 each have vessel 15a and mounting board 15b. Vessel 15a has a semicircular pillar shape. Vessels 15a are each formed to be fitted in second window hole 2ab of lid 2. Each second window hole 2ab is formed being depressed in a semicircular pillar shape conforming to the peripheral shape of vessel 15a so that vessel 15a faces outward relative to the direction perpendicular to outer bottom surface 2ca of lid 2.

Vessel 15a has through-hole 15aa in a direction perpendicular to the axial direction. Vessel 15a is formed such that second sensor 6 can be inserted in through-hole 15aa. Mounting board 15b has a rectangular plate-like shape. Mounting board 15b has third insertion holes 15c where terminals 6a1 of second sensor 6 are inserted. Mounting board 15b is fixed to vessel 15a so as to close through-hole 15aa of vessel 15a. Movable part 15 is mounted at mounting board 15b in a state where second sensor 6 is inserted in vessel 15a via through-hole 15aa. In a state where second sensor 6 is inserted in through-hole 15aa of vessel 15a, hood 9 is fixed to vessel 15a so as to be disposed over sensor cover 6b. Vessel 15a of movable part 15 can be displaced relative to lid 2 in a state where second sensor 6 is fitted in through-hole 15aa, and thus second sensor 6 is movable relative to lid 2.

In load control device 10, in order to secure space for allowing movable part 15 to move, first circuit board 13a on which first sensor 5 is mounted is smaller in size than first circuit board 13a of load control device 10 according to Embodiment 1.

Load control device 10 can adjust second detection ranges 10ba where second sensors 6 detect a person, by displacing movable part 15. Load control device 10 achieves further increased accuracy of detecting a person by adjusting second detection ranges 10ba of second sensors 6. Load control device 10 according to the present embodiment may include hoods 9 each having an appropriate shape different from that of Embodiment 1, as long as second sensors 6 are movable relative to lid 2. As well as load control device 10 according to Embodiment 1, load control device 10 according to the present embodiment achieves further increased accuracy of detecting a person by making first detection range 10aa and second detection ranges 10ba similar, which constitute the detection range of load control device 10, such that first detection range 10aa and second detection ranges 10ba substantially match.

As described above, the detection device according to an aspect of the present embodiment is a detection device including: a first sensor which detects, based on a captured image, whether a person is present in a first detection range; a plurality of second sensors which are disposed around the first sensor, and detect, based on infrared radiation, whether a person is present in respective second detection ranges each of which overlaps at least a portion of the first detection range; and at least one hood which blocks part of infrared radiation directed to at least one of the plurality of second sensors, to reduce a non-overlapping portion of a combined detection range of the first detection range of the first sensor and the second detection ranges of the plurality of second sensors, the non-overlapping portion being a portion in which the first detection range and the second detection ranges do not overlap.

Here, the at least one hood may be disposed to make a contour formed by the second detection ranges similar to a contour of the first detection range.

Here, the at least one hood may include a plurality of hoods, and the plurality of hoods may be provided one for each of the plurality of second sensors.

Here, the plurality of second sensors may each include a light receiver having a light-receiving surface for receiving infrared radiation, and having an optical axis that is inclined away from the first sensor, the optical axis being perpendicular to the light-receiving surface.

Here, the at least one hood may be detachably attached to the at least one of the plurality of second sensors.

Here, the detection device may further include a casing for disposing the first sensor and the plurality of second sensors, wherein the at least one hood may be detachably attached to the casing.

Here, the detection device may further include a casing for disposing the first sensor and the plurality of second sensors; and a movable part which displaces at least one of the plurality of second sensors relative to the casing.

Here, the at least one hood may be displaced relative to the casing, together with the at least one of the plurality of second sensors.

A load control device according to the present disclosure includes the above detection device; and a load controller which controls a load, based on a result of detection by the detection device.

Furthermore, a load control system according to the present disclosure includes: the above load control device; and a load which is controlled by the load control device.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A detection device comprising:
a first sensor which detects, based on a captured image, whether a person is present in a first detection range;
a plurality of second sensors which are disposed around the first sensor, and detect, based on infrared radiation emitted by a person, whether a person is present in respective second detection ranges each of which overlaps at least a portion of the first detection range; and at least one hood which blocks only part of infrared radiation emitted by a person which is directed to at least one of the plurality of second sensors, to reduce a non-overlapping portion of a combined detection range of the first detection range of the first sensor and the second detection ranges of the plurality of second sensors, the non-overlapping portion being a portion in which the first detection range and the second detection ranges do not overlap.

2. The detection device according to claim 1, wherein the at least one hood is disposed to make a contour formed by the second detection ranges similar to a contour of the first detection range.

3. The detection device according to claim 1, wherein
the at least one hood comprises a plurality of hoods, and
the plurality of hoods are provided one for each of the plurality of second sensors.

4. The detection device according to claim 1, wherein the plurality of second sensors each include a light receiver having a light-receiving surface for receiving infrared radiation, and having an optical axis that is inclined away from the first sensor, the optical axis being perpendicular to the light-receiving surface.

5. The detection device according to claim 1, wherein the at least one hood is detachably attached to the at least one of the plurality of second sensors.

6. The detection device according to claim 1, further comprising:
a casing for disposing the first sensor and the plurality of second sensors,
wherein the at least one hood is detachably attached to the casing.

7. The detection device according to claim 1, further comprising:
a casing for disposing the first sensor and the plurality of second sensors; and
a movable part which displaces at least one of the plurality of second sensors relative to the casing.

8. The detection device according to claim 7, wherein the at least one hood is displaced relative to the casing, together with the at least one of the plurality of second sensors.

9. A load control device comprising:
the detection device according to claim 1; and
a load controller which controls a load, based on a result of detection by the detection device.

10. A load control system comprising:
the load control device according to claim 9; and
the load which is controlled by the load control device.

* * * * *